United States Patent
Dreyer et al.

(10) Patent No.: US 7,693,592 B2
(45) Date of Patent: Apr. 6, 2010

(54) INTERFACE UNIT FOR AUTOMATION SYSTEMS AND METHOD OF PROVIDING AND INSTALLING SUCH AN INTERFACE

(75) Inventors: Thomas Dreyer, Dresden (DE); Gerd Limmer, Rückersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 1577 days.

(21) Appl. No.: 10/957,944

(22) Filed: Oct. 4, 2004

(65) Prior Publication Data

US 2006/0095545 A1    May 4, 2006

(51) Int. Cl.
*G06F 19/00* (2006.01)
(52) U.S. Cl. .......................... 700/95; 700/97
(58) Field of Classification Search .................. 700/95, 700/97
See application file for complete search history.

(56) References Cited

U.S. PATENT DOCUMENTS 5,974,236 A * 10/1999 Sherman ..................... 709/221
5,978,578 A * 11/1999 Azarya et al. ............... 717/100
2004/0098138 A1 * 5/2004 Boer et al. ..................... 700/1
2004/0205073 A1 * 10/2004 Chevanne et al. ........... 707/100

* cited by examiner

*Primary Examiner*—Ronald D Hartman, Jr.
(74) *Attorney, Agent, or Firm*—King & Spalding L.L.P.

(57) ABSTRACT

A method of integrating a machine or installation into an engineering/control system within the facility, such as an automation system, comprises the steps of receiving a definition or specification for applicable standards for communication between the engineering/control system within the facility and the machines or installations; manufacturing or providing a communication interface unit comprising enhanced interfaces to fulfill the definition or specification and adapting the communication interface unit to the definition or specification; providing the communication interface unit to a machine or installation manufacturer for manufacturing the machine or installation; delivering the machine or installation and the communication interface unit to the facility; and integrating the machine or installation equipped with the communication interface unit within the facility.

18 Claims, 4 Drawing Sheets

INTERFACE UNIT FOR AUTOMATION SYSTEMS AND METHOD OF PROVIDING AND INSTALLING SUCH AN INTERFACE

TECHNICAL FIELD OF THE INVENTION

The present application relates to automation systems and in particular to the integration of production and or manufacturing machines within a factory or plant.

BACKGROUND OF THE INVENTION

In modern factories or plants, engineering systems are provided to define processing steps in manufacturing and/or controlling certain process steps within the system. To this end, these engineering systems usually have to be coupled with the respective machines or installations to mirror the internal operating sequences within the engineering system. To this end the manufacturer or vendor of a respective machine or installation needed to provide the machine or installation with a data interface that was capable of complying with the existing standards of the engineering system to be controlled by them. However, many vendors and manufacturers of these machines either cannot provide for individual interfaces because individual functionality and interface specifications of a specific engineering system might vary from factory to factory. Thus, the factory owner must integrate new machines or installations himself by individually providing for the respective hardware and software for these new machines or installations. Moreover, new standards provide for additional functionality which often cannot be used because the existing interfaces do not support such functionality.

SUMMARY OF THE INVENTION

Therefore, it is an object of the present application to provide for an interface unit for machines or installations that is flexible enough to integrate new machines or installations into an existing factory and to provide for all necessary support of existing functions. It is a further object of the invention to provide for a business method of using such an interface in the design, re-design, expansion of automation system facilities or in the business of providing machines or installations for automation system facilities.

An exemplary method of integrating a machine or installation into an engineering/control system within the facility, such as an automation system, comprises the steps of receiving a definition or specification for applicable standards for communication between the engineering/control system within the facility and the machines or installations; manufacturing or providing a communication interface unit comprising enhanced interfaces to fulfill the definition or specification and adapting the communication interface unit to the definition or specification; providing the communication interface unit to a machine or installation manufacturer for manufacturing the machine or installation; delivering the machine or installation and the communication interface unit to the facility; and integrating the machine or installation equipped with the communication interface unit within the facility.

The communication interface unit can be provided by an integrator. The step of adapting the communication interface unit can be performed by an integrator or by the machine or installation manufacturer.

Another exemplary method of providing enhanced functionality within a facility comprising an engineering/control system coupled with a plurality of machines or installations, comprises the steps of receiving a definition or specification for applicable standards for communication between the facility and the machines or installations; providing or manufacturing a communication interface unit comprising enhanced interfaces to fulfill the definition or specification and adapting the communication interface unit to the definition or specification; adapting at least one machine or installation within the facility to the communication interface unit; and coupling the communication interface unit between the machine or installation and the engineering/control system within the facility.

The communication interface unit can provided by an integrator. The step of adapting the machine or installation can be performed by an integrator, a machine or installation manufacturer or a facility operator.

Yet another exemplary method of providing enhanced functionality within a facility comprising an engineering/control system coupled with a plurality of machines or installations, comprises the steps of receiving a definition or specification for applicable standards for communication between the engineering/control system within the facility and the machines or installations; providing or manufacturing a communication interface unit comprising enhanced interfaces to fulfill the definition or specification and adapting the communication interface unit to the definition or specification; adapting the communication interface unit to at least one machine or installation within the facility; and coupling the communication interface unit between the machine or installation and the engineering/control system within the facility.

The communication interface unit can be provided by an integrator. The step of adapting the machine or installation can be performed by an integrator, a machine or installation manufacturer or a facility operator.

Yet another exemplary method of providing enhanced functionality for a machines or installations, comprises the steps of creating a definition or specification for applicable standards for communication between a facility and machines or installations; providing or manufacturing a communication interface unit comprising enhanced interfaces to fulfill the definition or specification and adapting the communication interface unit to the definition or specification; coupling the communication interface unit with a machine or installation through a standard interface; and offering the machine or installation with the communication interface to a customer.

The step of creating the definition or specification can be performed by a machine or installation manufacturer. The step of adapting the communication interface unit can be performed by an integrator.

Yet another exemplary method of providing enhanced functionality for machines or installations coupled with an engineering/control system within a facility, comprises the steps of creating a definition or specification for applicable standards for communication between a facility and machines or installations; providing or manufacturing a communication interface unit comprising enhanced interfaces to fulfill the definition or specification and adapting the communication interface unit to the definition or specification; and coupling the communication interface unit with a machine or installation and with the engineering/control system.

The step of creating the definition or specification can be performed by a facility operator. The step of creating the definition or specification can also be performed by a machine or installation manufacturer. A plurality of machines and installations each can be equipped with the communication interface unit. This method may further comprise the step of providing a server and coupling the server with all communication interface units. The server may provide for an electronic diagnosis of the machines or installations.

An exemplary communication interface unit for integrating a machine or installation into an automation system, comprises a first interface for coupling the unit with an engineering system, a plurality of data interfaces coupled in parallel with the first interface; a data acquisition unit coupled with the plurality of data interfaces, and a second interface coupled with the data acquisition unit for coupling the unit with the machine or installation.

The unit may further comprise at least a third interface coupled with the data acquisition unit for coupling additional hardware with the unit. The additional hardware can be a barcode reader used with the machine or installation. The additional hardware can also be a sensor used with the machine or installation. The sensor can be selected from the group consisting of temperature sensor, humidity sensor, and pressure sensor. The third interface can be a graphical user interface used for controlling the machine or installation. The additional hardware can be an external control circuit used with the machine or installation. The data acquisition unit may comprise a microprocessor or microcontroller. The unit can be integrated within a fan-less housing. The plurality of data interfaces can be selected from the group consisting of SECS/GEM interface, EDA interface, EPT interface, and e-diagnostic interface. The plurality of data interfaces may include at least one 300 mm semiconductor standard interface. The data acquisition unit may further comprise a cell controller for controlling machine specific functions of an automation process. The first interface may include an Ethernet, a field bus and/or a serial interface.

Another exemplary communication interface unit for integrating a semiconductor manufacturing machine or installation into a semiconductor automation system, comprises a fan-less housing, a first interface arranged in the housing for coupling the unit with an engineering system, a plurality of data interfaces arranged in the housing coupled in parallel with the first interface including at least one 300 mm semiconductor standard interface; a data acquisition unit arranged in the housing coupled with the plurality of data interfaces, and a second interface arranged in the housing coupled with the data acquisition unit for coupling the unit with the machine or installation.

The unit may further comprise at least a third interface arranged in the housing coupled with the data acquisition unit for coupling additional hardware with the unit. The additional hardware can be a barcode reader used for identifying a wafer carrier. The additional hardware can be a sensor used with the machine or installation. The additional hardware can be an external control circuit used with the machine or installation. The plurality of data interfaces can be selected from the group consisting of SECS/GEM interface, EDA interface, EPT interface, and e-diagnostic interface. The data acquisition unit may further comprise a cell controller for controlling machine specific functions of an automation process.

DETAILED DESCRIPTION OF THE PREFERRED EMBODIMENTS

Figure 1:
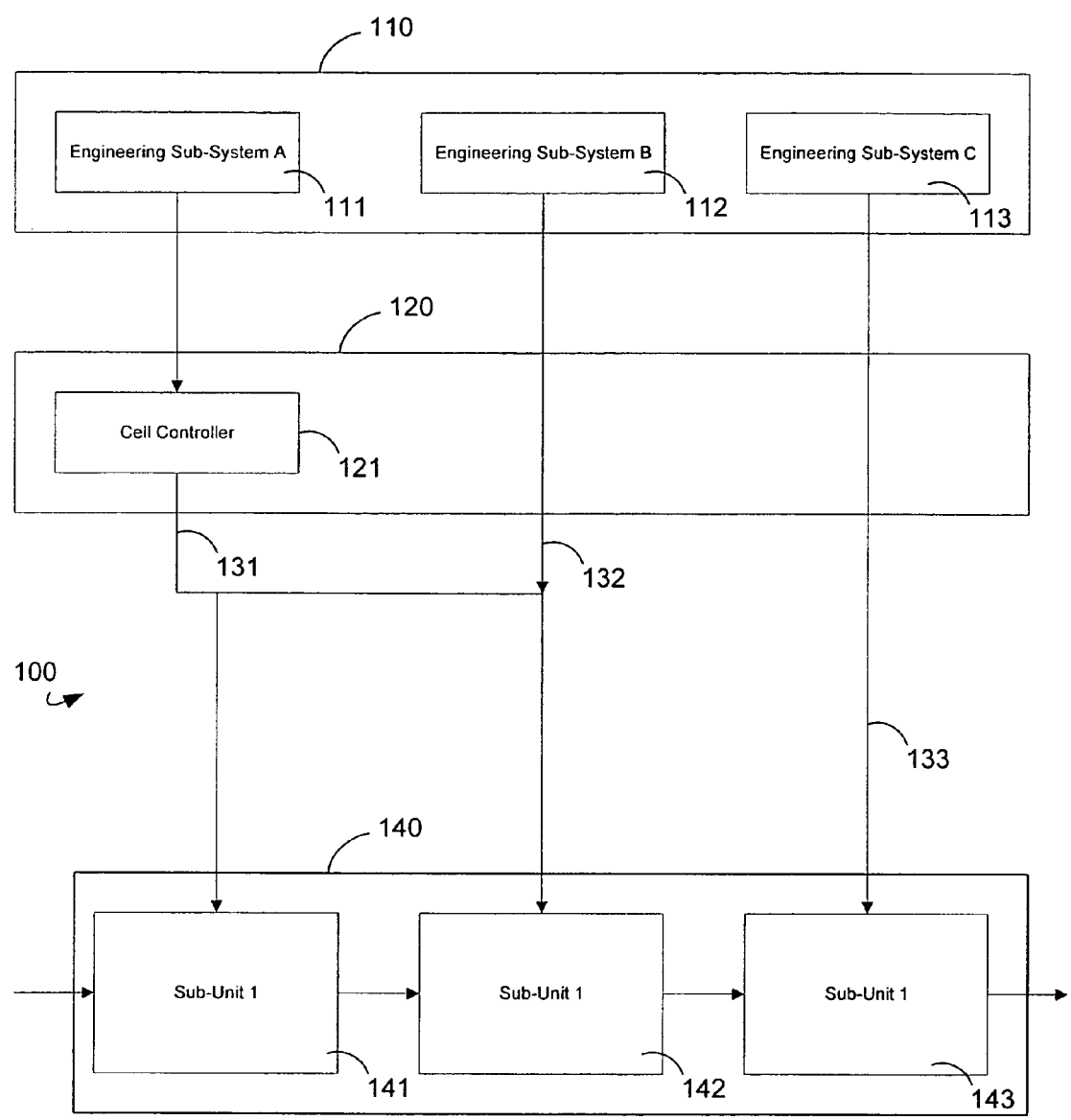
FIG. 1 shows an automation system according to the prior art.

FIG. 1 shows a conventional automation system 100 including an engineering system 110 with engineering sub-systems A, B, and C designated with numerals 111, 112, and 113, respectively. An integration layer 120 is also provided which includes for example a cell controller 121 which is coupled, for example, with one of the engineering systems, in this exemplary embodiment with engineering system A. A cell controller provides for adaptation software for a specific machine and or installation and, thus, provides for individual custom control functions of a machine or installation. A machine or installation 140 may include a plurality of sub-systems 141, 142, and 143 which may form a manufacturing machine such as, for example, an etcher. Different individual customary couplings 131, 132, and 133 connect the engineering systems 111, 112, and 113 with one or more sub-systems 141, 142, and 143 of the machine or installation 140. In this exemplary embodiment, sub units 141 and 142 receive custom control from the cell controller 121 through couplings 131 whereas in addition standard control is provided for sub units 142 and 143.

Any new machine or installation which complies with existing interfaces of system 100 may be easily integrated into such a system. However, newer machines or installations can provide for additional functionality and might provide intelligent interfaces which cannot be integrated into an existing system without adapting or redesigning the system. In particular, the semiconductor industry created a plurality of standards which facilitate the integration of new machines into an existing system. However, these standards are not designed in such a way that an integration of machines or installations can be done without any special integration adaptation. In particular the process steps which are defined in the engineering system have to be tuned to the existing interfaces. Not all new or existing machines or installations, however, do have the required interfaces to accomplish such an integration. Thus, the integration of new machines or installations into an existing system requires quite some effort, in particular integration work with respect to the data interfaces.

Figure 2:
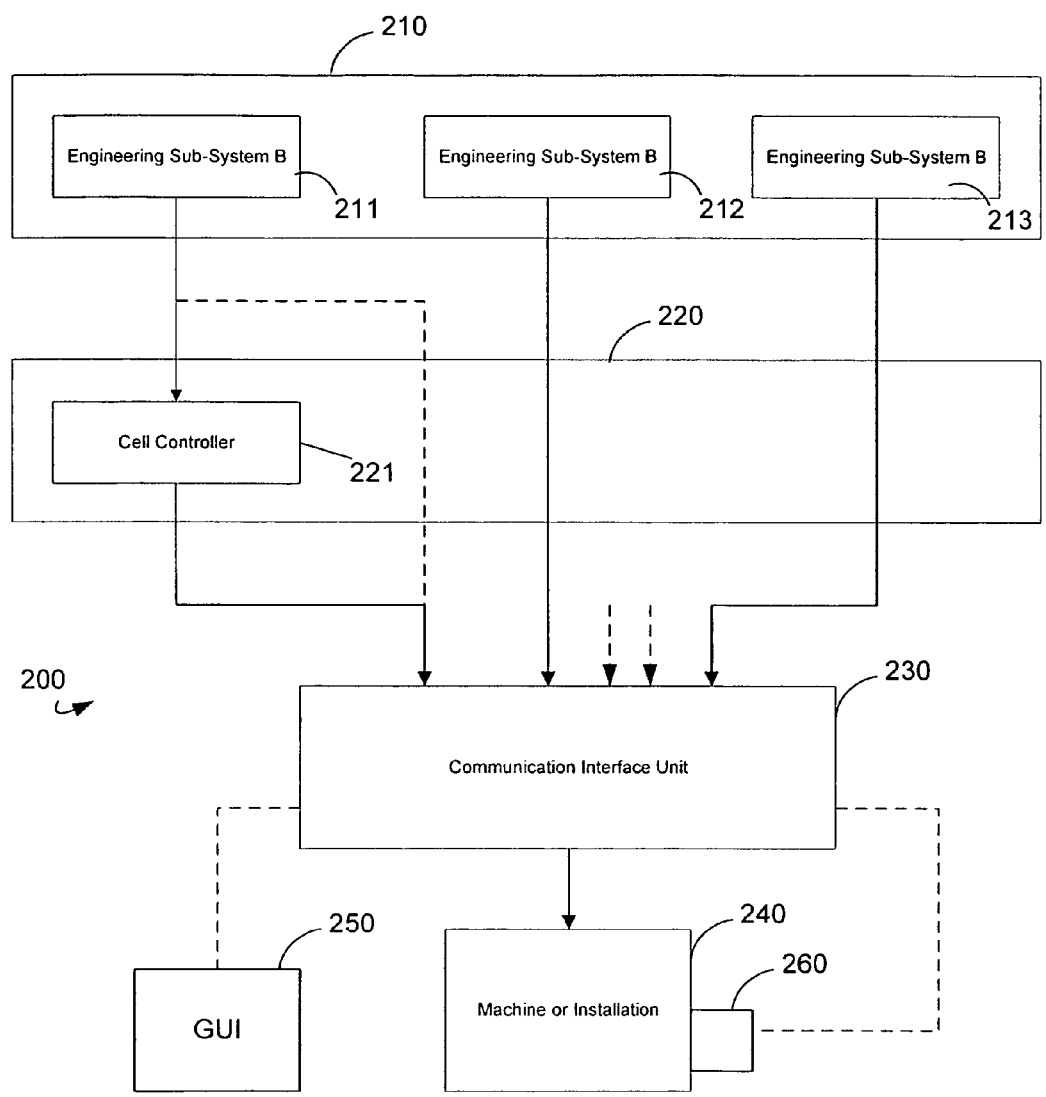
FIG. 2 shows an automation system according to the present invention.

FIG. 2 shows an automation system according to the present invention using a communication interface unit 230 for coupling a machine or installation with the existing engineering system 210, 220 which provides for a plurality functions with respect to the integration of a machine or installation into an existing system. Such a communication interface unit 230 can be designed to couple each machine or installation within a facility with the existing engineering system. The communication interface unit can provide for one or multiple couplings with the engineering system 210/220, such as network connections, standardized bus-structures and specific individual couplings such as Ethernet, field busses, RS232, USB, etc. Additional couplings can be provided as indicated by the additional dotted input lines. Usually a single machine or installation 230 connection using a standardized interface couples the machine or installation with the communication unit 230 is used. However, according to the present invention, additional hardware interfaces can be provided within the communication interface unit. For example, a graphical user interface 250 can be coupled with the unit 230 for controlling specific functions of the machine or installation which are often required to be performed manually. Furthermore, additional input and/or output devices 260 can be coupled to such an additional interface. Thus, for example, bar code readers or additional sensors, e.g. for measuring temperature, humidity or other environmental variables, can be used to further monitor or control the machine or installation 240. Also, additional control circuits can, thus, be easily implemented that provide for example, for a superimposed machine or installation control mechanism. In yet another embodiment, the cell controller 221 can be integrated into the communication interface unit 230. Thus, as indicated by the dotted line circumventing the cell controller 221, the whole layer 220 can be omitted.

Figure 3:
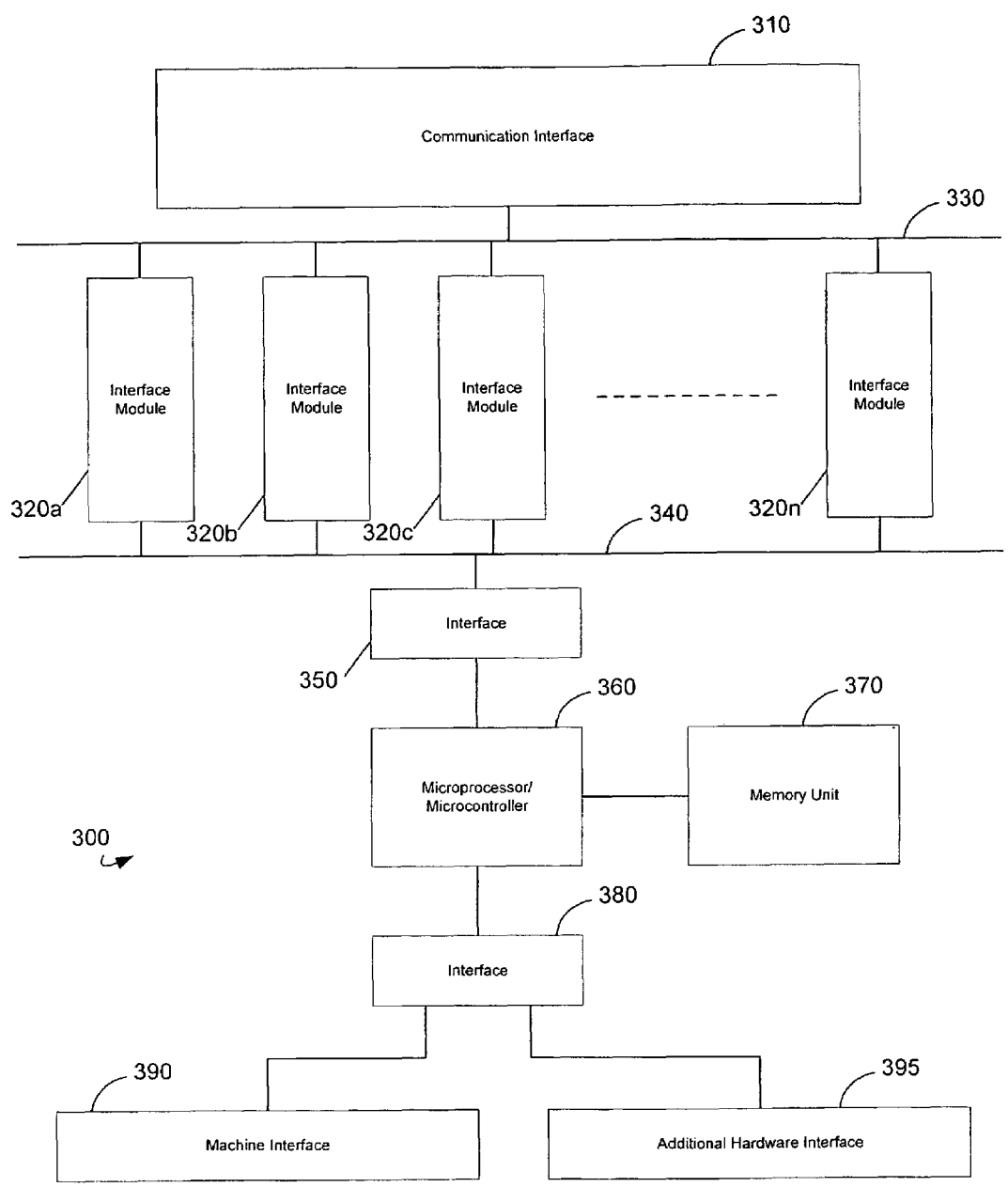
FIG. 3 shows an exemplary embodiment of an interface unit according to the present invention.

The communication interface unit is preferably modular in design and, thus, can include only those interfaces that are needed for proper integration. FIG. 3 shows an exemplary modular embodiment of a communication interface unit 300. A communication interface 310 provides for one or multiple standardized interface connections to the engineering system. A first internal bus structure can be provided which couple a plurality of internal modules 320*a*, 320*b*, 320*c*, ... 320*n* with the communication interface 310. A second bus structure may be provided to couple the modules 320*a*, 320*b*, 320*c*, ... 320*n* via an internal microprocessor interface 350 with a microprocessor or microcontroller 360. The microprocessor/controller 360 comprises a memory unit 370 and another internal interface unit 380 for coupling with a machine interface 390 and additional hardware interfaces 395. Each module provides for a specific interface. As an example, these interfaces may include but are not limited to:

SECS/GEM-Interface:
This interface is an application/software for communication between the engineering system and the machine or installation by using the SECS/GEM interface. The SECS/GEM interface consists of a set of standards by the SEMI organization which are at least, for example, SEMI E5 (aka SECS-2 protocol), SEMI E30 (aka GEM), SEMI E4 (aka SECS-I), and/or the SEMI E37 (aka HSMS). It provides compatibility for machines without a specific interface with the SECS/GEM standard with respect to the engineering system. If the respective process steps are integrated, even extended standards, in particular in the semiconductor manufacturing industry using standards related to the 300 mm wafer production, can be fulfilled by implementation of respective scenarios or models, such as error handling, unified monitoring, exception handling, recipe treatment, material treatment, etc. Such functionalities may, thus, exceed the normal abilities of the respective machines or installations. Thus, practically an idealized interface is provided by the communication interface unit 300 which will facilitate the integration of the machine or installation into the existing system.

EDA-Interface:
This module provides for an EDA interface as disclosed in the SEMI PR8 standard. The EDA has been re-defined in August 2004. The current standards are: SEMI E125/E125.1 Self Description; SEMI E132/E132.1 Security; SEMI E120 Equipment Structure; SEMI E134/E134.1 Data Collection Management.

EPT-Adaptor (Equipment Performance Tracking):
This module converts data generated by the machine or installation into data which is conform with the EPT-Standard E116 according to the standard SEMI E116. This module, thus, provides for a standard state model according to E116. This is a standard which defines equipment performance tracking of machines. Some of the OEMs may be unable to provide the information in the required format of E116. Thus, the communication interface unit can convert the machines data into E116 messages and data by means of such an interface.

Other Interfaces/Modules:
A plurality of other modules can be included to provide for different standards, for example, standards used in the semiconductor manufacturing industry. Thus, compatibility to models and scenarios which are not available within a respective machine or installation can be maintained. In the semiconductor manufacturing business, these standards may include but are not limited to:

SEMI E40: Standard for processing management.
SEMI E87: Specification for carrier management (CMS).
SEMI E94: Provisional specification for control job management.
SEMI E90: Specification for substrate tracking.
SEMI E42: Recipe management standard—Concepts, behavior, and message services.
SEMI E58: Automated reliability, availability, and maintainability standards (ARAMS)—Concepts, behavior and services.

e-Diagnostic Adaptor:
This module provides for transmission of data to an e-diagnostic system which can be superimposed. Such a system may evaluate and transfer data to external client systems and can also allow for a remote diagnostic and remote maintenance of a system. Also, a server coupled with all e-diagnostic interfaces may be used locally to run the respective diagnostic software.

Additional hardware not included in a machine or installation can either externally and/or internally be provided. Such hardware can be coupled through interface 380 and/or 395 with the microprocessor/controller 360. For example, special reader units for semiconductor wafer carriers, barcode reader and/or other input/output devices could be easily integrated into the system. Furthermore, additional external sensors can be integrated through such interfaces to allow for advanced process control for example, in the form of superimposed control circuits. Integration by means of the communication interface unit 300 allows for a transparent implementation of such additional tools or control units within the existing system.

The microprocessor/controller 360 controls all necessary data transfers within the communication interface unit 300. To this end, memory unit 370 comprises non-volatile memory for storing the respective programs and volatile or non-volatile memory for buffering in and outgoing data and parameters. The whole system can provide for additional interfaces if necessary to reprogram the unit. Alternatively, one of the standard interfaces in the communication interface unit 310 can be used to access and maintain the operating system of unit 300.

Figure 4:
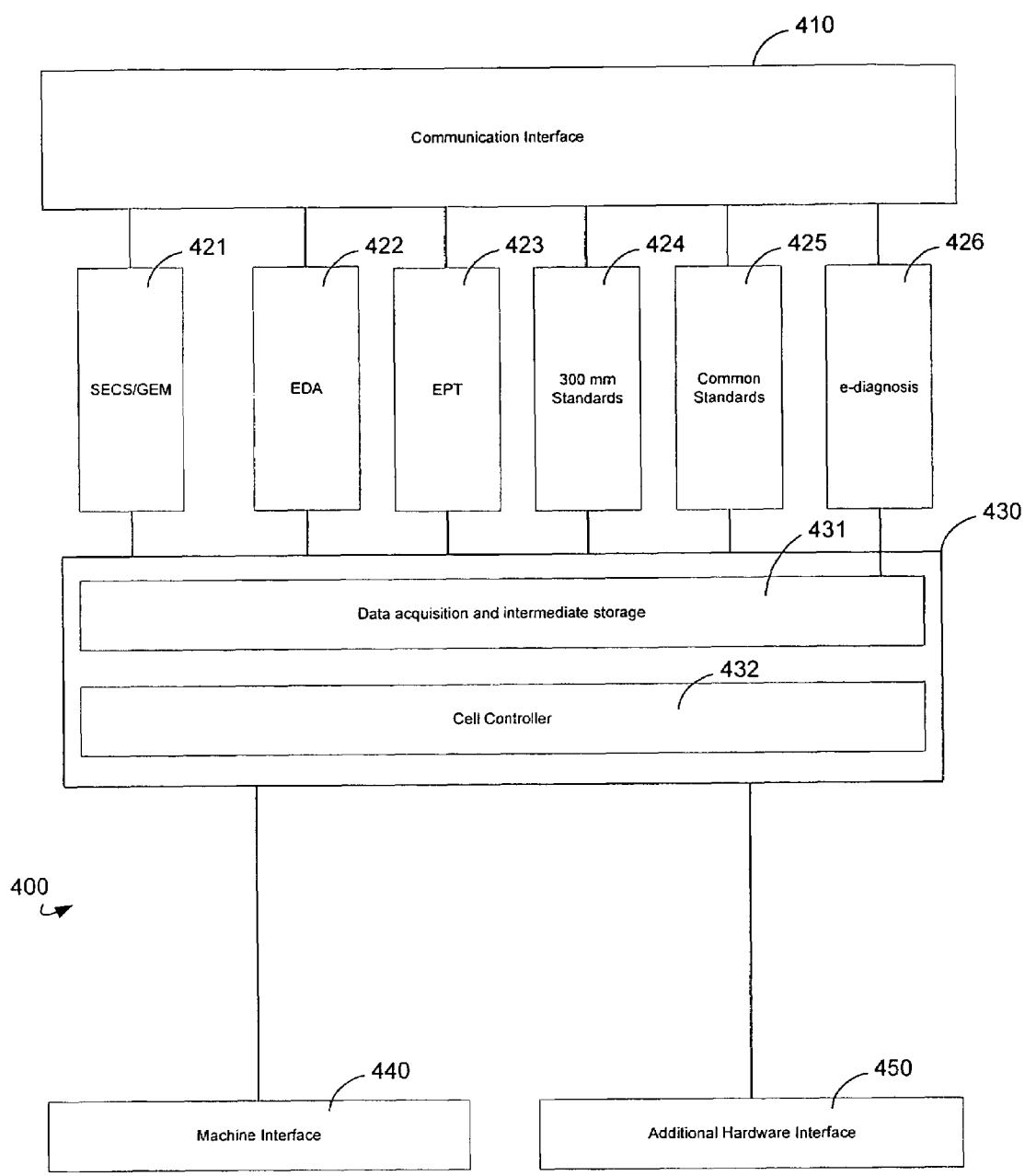
FIG. 4 shows another exemplary embodiment of an interface unit according to the present invention.

FIG. 4 shows another exemplary embodiment of a communication interface unit 400 with a fixed number of modules. Again, a communication interface 410 for providing external interface couplings with the engineering system is provided. Individual links to six interface modules are provided. A first interface module 421 provides for a SECS/GEM interface, a second module 422 for an EDA interface, a third module 423 for an EPT Adaptor, a fourth module 424 for certain 300 mm standards according to SEMI E40, E94, E87, and E90, a fifth module for common standard extensions, and a sixth module for an e-diagnostic adaptor. Each of the modules 421, 422, 423, 424, 425, and 426 is also coupled with a control unit 430 which can be implemented as shown in FIG. 3. Control unit 430 may comprise data acquisition and intermediate storage unit 431 as well as a cell controller 432. In case of integrating the cell controller into the communication interface unit 400, no external integration layer would be necessary. The communication interface unit 400 can then be directly coupled with the engineering system. This is particularly useful because the cell controller integration layer is particularly designed and adapted for a specific custom machine or installation. Such an integration into the communication interface unit can lead to significant cost reductions for the whole system.

On the machine or installation side two external interfaces 440 and 450 are provided wherein interface 440 forms the standard machine interface and interface 450 provides for an interface for additional hardware. Communication interface unit 400 can be integrated in a standard industry housing which allows for example for easy modular expansion if necessary. Moreover, the processing power required for such a system does not require high performance microprocessors. Thus, the whole system can be integrated without the need for cooling means such as fans. Thus, such a communication interface unit is particularly suitable for clean room environment as used in the semiconductor manufacturing industry, the pharmaceutical industry, or food manufacturing industry where low particle emissions have to be maintained.

Using a communication interface unit according to the present invention as disclosed, standard conform process steps of a machine or installation can be easily replicated or mirrored in an engineering system of a facility by using the standardized interface SECS/GEM. Additional, in particular newer interfaces, as for example common in the semiconductor manufacturing industry, can be easily integrated and supported. The unit also allows for integration of state models according to EPT standards and can integrate e-diagnostic functions for remote diagnosis, remote maintenance and self diagnosis functions. Furthermore, the unit allows for providing data for the use of external advanced process control systems or for providing such functionality directly from within the communication interface unit. Fault detection and classification systems can be integrated directly at the machine or installation. Furthermore, such a communication interface unit can integrate the cell controller of the integration layer directly into the unit. The unit can furthermore provide for additional interfaces such as graphic user interfaces for manufacturing execution systems.

In particular when designing a new manufacturing facility such a communication interface unit can be a predefined means for an effective and easy integration of a variety of machines, installations and tools. To this end the facility operator defines the respective standards and their application. As a result a variety of different interface modules will be implemented. Furthermore, the necessary software to run the communication interface unit is designed and the configuration parameters and variables are implemented into the communication interface unit. This step can either be performed by the facility operator or by an external integrator (system designer or vendor) supplying the communication interface unit. As a result, a communication interface unit particularly adapted and customized for a new facility is created. This communication interface unit fulfills all custom requirements of the respective facility. Once this communication interface unit is made available, it can be distributed to different OEMs as a basis for designing the interfaces to their respective machines or installations. The preconfigured communication interface unit is then coupled with the respective machine or installation by the OEM or integrator and the communication interface unit is, thus, finally adapted/configured. As a result a communication interface unit is created that is adapted to the engineering/control system within the facility as well as the respective machine or installation. Finally, the machine or installation is transferred to the facility from the respective OEM. The communication interface unit can then be coupled to the machine or installation. The necessary time for integration of the machine or installation is, thus, minimized because all necessary integration/adaptation steps have already been performed.

The communication interface unit, thus, serves as a defined communication partner defining a custom standard. Machine specific standards can be created on top of this standard for each individual communication interface unit. Thus, any exceptions, additional controls or standards can be easily realized within the communication interface unit. The machine or installation as well as the engineering/control system within the facility do not have to be changed. Any changes within the communication link between the engineering/control system within the facility and the machine or installation are performed only within the communication interface unit which will facilitate such a process. In case the adaptation/integration is performed by an external integrator, the integrator has the possibility to easily transfer an already integrated machine or installation to another facility because only the communication interface unit has to be adapted.

In case of expanding existing facilities which already comprise a plurality of integrated machines of installations, the use of a communication interface unit according to the present invention can be advantageous. In such a case, the communication interface unit provides for extended functionality in particular of functions previously not available or not supported by OEMs. In such a scenario, the communication interface unit is used as an interface between the engineering/control system within the facility and the respective machine or installation to provide for more (quantity) and/or better (quality) interfaces. For example, EDA data could be made available for existing machines. A method of using a communication interface unit according to the present invention in such a scenario could be: The facility operator first defines which standards are to be fulfilled in which way. As a result, the respective interface will be defined. Then, an integrator or the facility operator performs the respective necessary adaptations or changes in the communication interface unit to integrate the communication interface unit within the respective facility. Then, the integrator or the facility operator will adapt the existing or new machine or installation to the new communication interface unit. To this end, the communication interface unit is used and the necessary data will be adapted to work with the engineering/control system within the facility through the communication interface unit. As a result a customized communication interface unit is created. This communication interface unit can be used to interface the existing machines or installations within the facility. The integration process will be fast because all interfaces have been tested and usual maintenance periods might be long enough to perform this integration.

Thus, existing facilities are able to use newer systems which usually require communication methods which are simply not available. A new idealized standard is created by the communication interface unit and allows for integration of newer systems without the requirement to alter existing machines or installations. OEM manufacturers can easily expand the communication methods of a machine or installation without interfering with the control mechanism. Thus, reaction to specific requirements of different customers will be facilitated.

The communication interface unit can also be used in case of upgrading existing machines or installations in existing or new facilities. To this end, machines or installations which do not provide for an interface in an existing facility or for a new facility will be provided with a standardized interface. For example, certain equipment such as abatement systems and or gas cabinets etc. initially may not provide for an interface. To this end a method for providing such machines with an interface could be: The facility operator first defines which standards are to be fulfilled in which way. As a result, the respective interface will be defined. The communication interface unit is configured according to the previous definition. This step can be performed by either the integrator or the facility operator. The integrator, the facility operator or the OEM adapt the existing data to the communication interface unit. To this end, field busses such as PROFIBUS, PROFINET, CAN, Devicenet, or S7 couplings, etc. can be used. Finally, the communication interface unit can be installed by the integrator or the facility operator.

Thus, equipment not provided for system integration can now be integrated into an existing system. Such equipment can be interfaced with the same idealized interface fulfilling the same standard as defined. Furthermore, extending this kind of equipment with a standardized interface through a communication interface unit allows for linking facility areas which used to be separated, such as for example wafer production and other areas of the facility which are typically not linked.

The communication interface unit can also be used in general by OEMs. Thus, OEMs can equip their existing machines or installations with new interfaces, expand their own interfaces and the functionality of their machines or installations. The following methods can be used in conjunction with a communication interface unit. The OEM defines a new interface for his machines. As a result a data interface is defined. This step could also be performed by an integrator which is contracted by the OEM. The communication interface unit is configured according to this specification and the functionality is tested with the existing machines. The OEM can offer its customers the new interface as extended versions of its machines. Either OEM or integrator can actually couple the communication interface unit with the machine for operation. This method has the advantage that no machine software changes are necessary. Furthermore, this solution can be transferred to other and/or new customers. Custom specific adaptations will not affect the machines or installations because they can be realized within the communication interface unit.

In another method, the facility operator defines/specifies the interface and the necessary application scenarios. The OEM, then uses the communication interface unit to define one or more interfaces according to the specification using the existing data. This step can be performed by the OEM or a contracted integrator. Next, follows testing and certification of the communication interface unit coupled with the machine. The OEM or integrator delivers the new communication interface unit and installs it within the existing system. This method is in particular advantageous if the OEM itself cannot provide the respective interface and in need of a simple and cost efficient solution.

Yet in another method, the OEM or the facility operator defines the interface for a new facility and its machines or installations. Thus, a specification is created. The, OEM or the integrator use the communication interface unit to make the machine data available to the new facility. The communication interface unit can be tested for all types of machines and installations and integrated into the system by the OEM or integrator. Such a scenario allows for implementation of new functions within a facility. For example, in case a facility operator wants to introduce an electronic diagnosis system within his facility, the communication interface unit can be used to provide each machine or installation with such a functionality. Such an extension can be sold as a complete system including communication interface units, a server system and respective software to provide for an electronic diagnosis function.

What is claimed is:

1. A method of integrating a machine or installation into an engineering or a control system within a facility, the facility comprising a definition or specification for applicable standards for communication between said engineering or control system within the facility and said machines or installations, the method comprising the steps of:
    manufacturing or providing a communication interface unit comprising enhanced and adapted interfaces to fulfill said definition or specification;
    providing said communication interface unit to a machine or installation manufacturer for manufacturing said machine or installation;
    delivering said machine or installation and said communication interface unit to said facility; and
    integrating said machine or installation equipped with said communication interface unit within said facility.

2. The method according to claim 1, wherein said communication interface unit is provided by an integrator.

3. The method according to claim 1, wherein said step of adapting said communication interface unit is performed by an integrator or by said machine or installation manufacturer.

4. A method of providing enhanced functionality within a facility comprising an engineering or a control system coupled with a plurality of machines or installations, and a definition or specification for applicable standards for communication between said facility and said machines or installations, the method comprising the steps of:
    providing or manufacturing a communication interface unit comprising enhanced and adapted interfaces to fulfill said definition or specification;
    adapting at least one machine or installation within said facility to said communication interface unit; and
    coupling said communication interface unit between said machine or installation and said engineering or control system within the facility.

5. The method according to claim 4, wherein said communication interface unit is provided by an integrator.

6. The method according to claim 4, wherein said step of adapting said machine or installation is performed by an integrator, a machine or installation manufacturer or a facility operator.

7. A method of providing enhanced functionality within a facility comprising an engineering or a control system coupled with a plurality of machines or installations, and a definition or specification for applicable standards for communication between said engineering or control system within the facility and said machines or installations, the method comprising the steps of:
    providing or manufacturing a communication interface unit comprising enhanced and adapted interfaces to fulfill said definition or specification;
    adapting said communication interface unit to at least one machine or installation within said facility; and
    coupling said communication interface unit between said machine or installation and said engineering or control system within the facility.

8. The method according to claim 7, wherein said communication interface unit is provided by an integrator.

9. The method according to claim 7, wherein said step of adapting said machine or installation is performed by an integrator, a machine or installation manufacturer or a facility operator.

10. A method of providing enhanced functionality for machines or installations, comprising the steps of:

creating a definition or specification for applicable standards for communication between a facility and machines or installations;

providing or manufacturing a communication interface unit comprising enhanced and adapted interfaces to fulfill said definition or specification;

coupling said communication interface unit with a machine or installation through a standard interface; and offering said machine or installation with said communication interface to a customer.

11. The method according to claim 10, wherein said step of creating said definition or specification is performed by a machine or installation manufacturer.

12. The method according to claim 10, wherein said step of adapting said communication interface unit is performed by an integrator.

13. A method of providing enhanced functionality for machines or installations coupled with an engineering or a control system within a facility, comprising the steps of:

creating a definition or specification for applicable standards for communication between a facility and machines or installations;

providing or manufacturing a communication interface unit comprising enhanced and adapted interfaces to fulfill said definition or specification; and coupling said communication interface unit with a machine or installation and with said engineering or control system.

14. The method according to claim 13, wherein said step of creating said definition or specification is performed by a facility operator.

15. The method according to claim 13, wherein said step of creating said definition or specification is performed by a machine or installation manufacturer.

16. The method according to claim 13, wherein a plurality of machines and installations each is equipped with said communication interface unit.

17. The method according to claim 16, further comprising the step of providing a server and coupling said server with all communication interface units.

18. The method according to claim 17, wherein the server provides for an electronic diagnosis of said machines or installations.

* * * * *